United States Patent [19]

Landucci et al.

[11] 3,976,743
[45] Aug. 24, 1976

[54] TREATMENT OF ZINC PLANT RESIDUE

[75] Inventors: Louis Landucci, Trail; Donald Roderick McKay; Ernest George Parker, both of Rossland, all of Canada

[73] Assignee: Cominco Ltd., Vancouver, Canada

[22] Filed: Aug. 5, 1975

[21] Appl. No.: 602,020

[30] Foreign Application Priority Data
Sept. 13, 1974 United Kingdom............... 40112/74

[52] U.S. Cl................................ 423/101; 423/109; 423/140; 423/141; 423/633
[51] Int. Cl.[2]...................... C01G 9/06; C01G 49/06
[58] Field of Search ........... 423/101, 102, 104, 106, 423/109, 632, 633, 140, 141, 142; 75/115, 120

[56] References Cited
UNITED STATES PATENTS

| | | | |
|---|---|---|---|
| 2,898,197 | 8/1959 | Forward et al. ..................... | 423/106 |
| 3,113,860 | 12/1963 | Pagel .................................. | 423/109 |
| 3,193,382 | 7/1965 | Veltman et al. .................... | 423/109 |
| 3,375,066 | 3/1968 | Murakami et al. ................. | 423/142 |
| 3,493,365 | 2/1970 | Pickering et al..................... | 75/120 |
| 3,867,516 | 2/1975 | Bodson ............................... | 423/633 |

*Primary Examiner*—Oscar R. Vertiz
*Assistant Examiner*—Brian E. Hearn

[57] ABSTRACT

A process for the treatment of zinc plant residue formed on leaching zinc calcine with sulphuric acid in which the residue is leached in a first leaching step with a sulphuric acid solution at atmospheric pressure, and a temperature above about 60°C, in the presence of excess zinc sulphide reductant whereby ferric iron in the residue is reduced to the ferrous state, thereby forming a zinc sulphate solution containing excess acid, ferrous iron and other dissolved impurities such as germanium, indium, gallium, antimony and arsenic nd a mixture of solids containing undigested zinc residue, lead residue, and unreacted zinc sulphide. Clarified solution is separated, preferably by thickening, from the mixture of solids. The mixture of solids is leached in a second residue leaching step at atmospheric pressure and at a temperature above about 60°C in a solution which is substantially higher in acid than the solution in the first leaching step, unreacted zinc sulphide from the first residue leaching step providing reducing conditions in the second residue leaching step. Slurry from the second residue leaching step is treated by flotation to separate a froth product comprising unreacted zinc sulphide and elemental sulphur, a tailings product containing gangue and a lead residue, and an acidic solution which is recycled to the first residue leaching step. A portion of the clarified zinc sulphate solution from the first residue leaching step is treated by oxidizing a small part of the ferrous iron contained therein, and neutralizing this portion of the solution with limerock to precipitate solids containing oxidized iron, gypsum, and the other impurities. These precipitated solids are separated and this portion of the solution is combined with the remainder of the clarified zinc sulphate solution. Ferrous iron in the combined solution is oxidized to precipitate ferric iron compounds which are separated from the solution to provide purified zinc sulphate solution which is recovered.

20 Claims, 1 Drawing Figure

TREATMENT OF ZINC PLANT RESIDUE

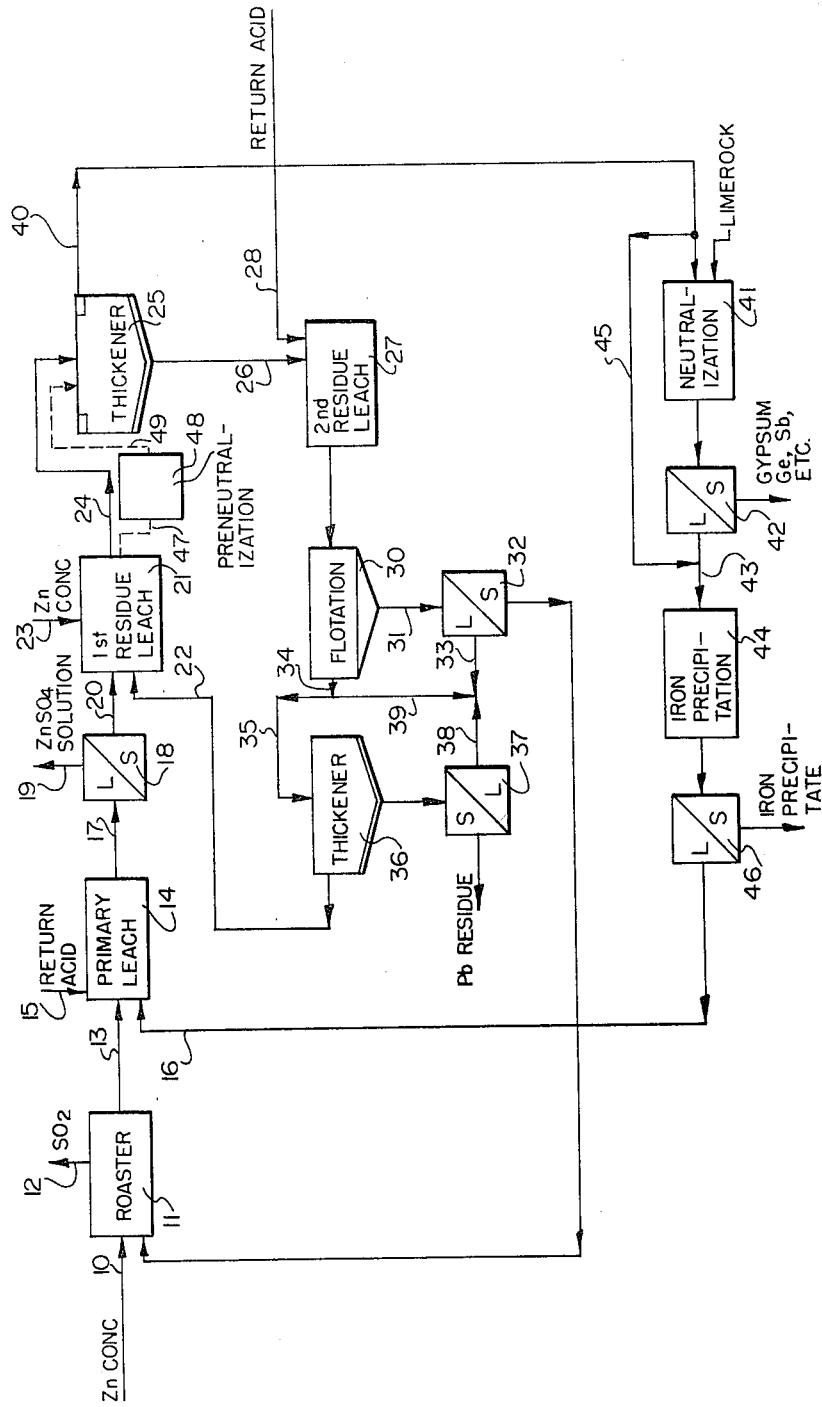

3,976,743

TREATMENT OF ZINC PLANT RESIDUE

BACKGROUND OF THE INVENTION

This invention relates to an improved hydrometallurgical method of treating zinc plant residue, to obtain zinc sulphate solution which is substantially free of iron.

Leaching of calcined zinc ores or concentrates is a well known method of providing zinc sulphate solution, from which zinc may then be recovered by electrolysis. However, a substantial part of the zinc in the material being leached remains, primarily as zinc ferrite, in an undissolved residue which must be further treated to provide economic recovery of the zinc initially present.

Various methods have been suggested for the recovery of the zinc values from these residues, for example roasting the residue with a concentrated sulphuric acid to solubilize the zinc value. Also, leaching the residue at a variety of temperatures and pressures with sulphuric acid, under both oxidizing and reducing conditions, has been suggested. However, none of these methods have been found completely acceptable, primarily because they do not provide economic recovery of zinc and sulphur values from materials used to give reducing conditions or to neutralize excess acid.

SUMMARY OF THE INVENTION

According to this invention, a process is provided for the treatment of zinc plant residue formed on leaching zinc calcine with sulphuric acid which comprises: leaching the residue in a first leaching step with a sulphuric acid solution at atmospheric pressure, and a temperature above about 60°C, in the presence of excess particulate sulphide reductant such as zinc sulphide concentrate whereby ferric iron in the residue is reduced to the ferrous state, thereby forming a slurry of zinc sulphate solution containing excess sulphuric acid and having ferrous iron and other impurities such as germanium, indium, gallium, antimony and arsenic dissolved therein, and a mixture of solids containing undissolved zinc residue, insoluble lead-containing residue, and unreacted zinc sulphide; separating the solution from the mixture of solids; leaching the mixture of solids in a second residue leaching step at atmospheric pressure and at a temperature above about 60°C with a sulphuric acid solution which is substantially higher in acid than the acid solution in the first residue leaching step, the unreacted particulate sulphide reductant from the first residue leaching step providing reducing conditions in the second residue leaching step; treating slurry formed in the second residue leaching step by flotation and liquid-solids separation to separate a froth product comprising unreacted zinc sulphide and elemental sulphur, a tailings product comprising gangue and a lead-containing residue, and an acidic solution; recycling the acidic solution to the first residue leaching step; treating a portion of the zinc sulphate solution separated after the first residue leaching step by oxidizing a small part of the ferrous iron in said portion of the solution; neutralizing this portion of the solution with limerock to precipitate solids containing oxidized iron, gypsum, and other impurities; separating the precipitated solids from this portion of the solution; combining this portion with the remaining portion of zinc sulphate solution not so treated; oxidizing ferrous iron in the combined solution to precipitate ferric iron compounds; separating the ferric iron compounds from the resulting zinc sulphate solution; and recovering the zinc sulphate solution.

In a preferred embodiment, this invention provides a process for the treatment of zinc plant residue formed on leaching zinc calcine with sulphuric acid which comprises: leaching the residue in a first residue leaching step with a sulphuric acid solution containing 120 to 140 g/l $H_2SO_4$ at atmospheric pressure and a temperature between 60°C and the boiling point of the solution, in the presence of excess zinc sulphide reductant, whereby ferric iron in the residue is reduced to the ferrous state, thereby forming a slurry of zinc sulphate solution containing about 10 to 20 g/l $H_2SO_4$, about 35 to 45 g/l ferrous iron and other impurities of the group germanium, indium, gallium, antimony and arsenic dissolved therein and a mixture of solids containing undissolved zinc plant residue, insoluble lead-containing residue, and unreacted zinc sulphide reductant; thickening the slurry to separate an overflow of clarified zinc sulphate solution containing said sulphuric acid, ferrous iron and dissolved impurities, from an underflow containing the mixture of solids; leaching the underflow thus obtained in a second residue leaching step with a solution which is substantially higher in acid than the solution used in the first leaching step at atmospheric pressure and at a temperature between 60°C and the boiling point of the solution, the unreacted zinc sulphide reductant from the first residue leaching step providing reducing conditions in said second residue leaching step; treating slurry formed in the second residue leaching step by flotation and liquid-solids separation to separate a froth product comprising unreacted zinc sulphide and elemental sulphur, a tailings product comprising gangue and a lead-containing residue, and an acidic solution; recycling this acidic solution containing zinc sulphate, ferrous iron and 120 to 140 g/l $H_2SO_4$ to the first residue leaching step; treating at least a portion of the overflow clarified zinc sulphate solution from the first residue leaching step by oxidizing from about 1 to 7% of the ferrous iron in this portion of the solution; neutralizing this portion of the solution with limerock to about pH 4.5 to precipitate solids containing oxidized iron, gypsum, and said other impurities; separating the precipitated solids from this portion of the zinc sulphate solution; combining this portion with the remainder of zinc sulphate solution not so treated; oxidizing ferrous iron in the combined solution to precipitate ferric iron compounds; separating the ferric iron compounds from the resulting zinc sulphate solution; and recovering the zinc sulphate solution.

Preferably, the zinc sulphate solution is returned to the zinc calcine leaching step for reaction of sulphuric acid contained therein with zinc calcine and recovery of neutral zinc sulphate solution.

Conveniently, the acidic solution from the second residue leaching step provides the sulphuric acid used in the first residue leaching step.

Conveniently, the unreacted zinc sulphide containing material and elemental sulphur separated in the flotation step are fed to a roaster in which zinc ore concentrate is calcined.

Preferably, the sulphuric acid used in the second residue leaching step is fortified with concentrated sulphuric acid.

Preferably, at least about one third of the zinc sulphate solution, separated from the mixture of solids after the first residue leaching step, preferably as an overflow of clarified solution, is neutralized to precipitate impurities, and the portion of the solution not being so treated passes through a neutralizer by-pass, to combine with purified solution, before entering the step in which ferrous iron is oxidized and precipitated as ferric iron.

Conveniently, the slurry from the first residue leaching step is treated, before separating the mixture of solids as by thickening, with zinc oxide or zinc calcine to decrease the acid in the slurry to about 2 to 3 g/l $H_2SO_4$, and a clarified zinc sulphate solution containing 2 to 3 g/l $H_2SO_4$, about 35 to 45 g/l from ferrous iron and the other dissolved impurities is purified.

Preferably, the zinc sulphide reductant is particulate zinc concentrate which has been ground before being added to the first residue leaching step.

Preferably, the ferrous iron in solution after separation of solids, precipitated in the limerock neutralization step is oxidized in an autoclave to precipitate hematite, in a reaction which raises the acidity of the solution containing zinc sulphate to about 60 to 70 g/l $H_2SO_4$, and the hematite is recovered.

In the process of the present invention, leaching of zinc plant residues with sulphuric acid is carried out in two steps at ambient pressure under reducing conditions and at a temperature near the boiling point of the solution. Reduction of ferric iron is provided by an excess of particulate zinc sulphide containing material such as zinc concentrate, which is added to the first leaching step. Solids separated after the first leaching treatment are further treated in the second leaching step. A flotation step then removes unreacted zinc concentrate and elemental sulphur formed during leaching leaving a sulphate solution and a residue containing lead and silver. This lead-containing residue is separated from the solution which is then returned to the first leaching step. Zinc sulphate solution discharging from the first residue leaching step and containing ferrous iron and other impurities and about 10 to 20 g/l excess sulphuric acid is separated from solids and is then neutralized, all or in part in one or two stages, with limerock to precipitate impurities. Ferrous iron remaining in solution is then removed by oxidation and precipitation, and solution containing zinc sulphate and excess sulphuric acid is directed to the leaching of calcined ore or concentrate, from which step is derived the zinc plant residue treated in this process and neutral zinc sulphate solution.

BRIEF DESCRIPTION OF THE DRAWINGS

The process will now be described in detail, reference being made to the attached flow diagram which also shows the process as it relates to the more general treatment of zinc concentrate.

DESCRIPTION OF THE PREFERRED EMBODIMENT

Zinc sulphide concentrate 10 is calcined in roaster 11 with the release of sulphur dioxide 12. Calcined concentrate 13 is treated in a conventional manner in primary leaching vessel 14 with sulphuric acid obtained from two streams, return acid 15, containing about 140 g/l $H_2SO_4$, from electrolytic cells and recycled acid 16, containing about 60 to 70 g/l $H_2SO_4$, from the process of the present invention. Slurry 17 from primary leaching vessel 14 goes to liquid-solid separator 18 from which neutral zinc sulphate solution 19 is directed to purification for use as feed for electrolytic cells. Zinc plant residue 20, which is treated by the process of the present invention enters first residue leaching vessel 21 where it is leached with a sulphuric acid solution containing about 120 to 140 g/l $H_2SO_4$ at atmospheric pressure and a temperature between 60°C and the boiling point of the solution in the presence of a reductant in the form of zinc sulphide concentrate. The sulphuric acid is recycled from the process and enters vessel 21 through line 22, while entry of zinc concentrate is shown by arrow 23.

Slurry discharging from vessel 21 comprises zinc sulphate solution containing 10 to 20 g/l $H_2SO_4$, 35 to 45 g/l ferrous iron, dissolved impurities such as germanium, indium, gallium, antimony and arsenic, and undissolved solids. It follows line 24 to thickener 25 for separation into an overflow of clarified solution and an underflow containing the undissolved solids. Optionally, the slurry may follow line 47 to preneutralizer 48, as hereinafter explained, and thence to thickener 25. Thickener underflow, which contains undissolved zinc plant residue, gangue and insoluble solids generally known as lead residue as well as unreacted added zinc concentrate, moves through line 26 to second residue leaching vessel 27. Return acid (from electrolytic cells) which may be fortified by concentrated sulphuric acid, enters vessel 27 by line 28. In this vessel there is further extraction of zinc and iron from the residue, under reducing conditions provided by the zinc concentrate. Because of the separation of clarified solution and the addition of return acid, the solution in vessel 27 is substantially higher in acid and lower in zinc and iron than the solution in vessel 21. The more refractory compounds, such as complex plumbo-jarosites, are decomposed. Slurry discharging from vessel 27 contains about 120 to 140 g/l $H_2SO_4$ and almost all the iron is in solution in the ferrous state. This slurry moves through line 29 to flotation cell 30 where unreacted zinc sulphide concentrate and elemental sulphur formed by the reduction reaction are separated as a froth product. The lead residue and gangue remain with the tailings. Known flotation technology is used in this step. The froth product moves through line 31 to liquid-solid separator 32 from which the elemental sulphur and unreacted zinc sulphide concentrate may be fed to roaster 11 and subsequent processing for recovery of metal and sulphur values. In this way, oxidation of these sulphur values to waste product sulphate is avoided. Liquid containing zinc sulphate solution and free sulphuric acid leaves separator 32 through line 33 to be returned to leaching vessel 21 directly or via lines 39, 35, thickener 26 and line 22 as shown. Tailings from flotation cell 30 are directed through lines 34 and 35 to thickener 36, from which the underflow moves to liquid-solid separator 37 for recovery of lead and silver in a solid residue. These separations permit more economic recovery of the lead and silver values from a residue which is not diluted by the excess zinc sulphide concentrate and also permits recycling of the zinc values without accumulation of lead and silver values in the circuit. Liquid from this separator moves through lines 38, 39 and 35 to thickener 36. Tailings thickener overflow solution, containing zinc sulphate solution, ferrous iron and excess sulphuric acid is returned by line 22 to leaching vessel 21.

Overflow solution from thickener 25 is treated for the removal of iron and other dissolved impurities. Neutralization of the solution, which contains as much as 20 g/l excess sulphuric acid, and oxidation of the iron to the ferric state are required. In prior processes, it is usual to neutralize excess sulphuric acid with zinc oxide or calcined zinc concentrate. Zinc goes into solution as zinc sulphate but a substantial portion of the zinc is undissolved and may be lost in an iron precipitate. In one modification of the present process, solution in slurry from first residue leaching vessel 21, and containing about 10 to 20 g/l $H_2SO_4$, moves directly through line 24 to thickener 25 for removal of solids and thence through line 40 to neutralization treatment with limerock in vessel 41 to precipitate dissolved impurities. In another modification of the process, slurry from residue leaching vessel 21 flows through line 47 to preneutralizer vessel 48 to which zinc oxide or zinc calcine is added in sufficient quantity to decrease the acidity in the slurry to about 2 to 3 g/l $H_2SO_4$ and thence through line 49 to thickener 25. Vessel 48 is a small agitator. Use of finely divided zinc oxide or zinc calcine particles ensures rapid neutralization. The quantity of neutralizing agent is determined from acidity determinations before and after vessel 48. Residue formed in this neutralization is separated with first leaching residue into thickener 25 underflow, and clarified solution containing about 2 to 3 g/l $H_2SO_4$ is advanced through line 40. Neutralization of only part of the excess acid in the slurry to maintain an excess of 44. Without this precipitation and removal, impurities accumulate in cycling solution to objectionable concentrations. Their level may be kept sufficiently low if part of the solution from thickener 25 is neutralized in vessel 41. In this case, untreated solution may flow through bypass 45.

In vessel 44, iron is oxidized to the ferric state and precipitated in a form such as hematite, goethite, jarosite or basic iron sulphate. A prior art process, e.g. that of Canadian Patent No. 724,592 to form basic iron sulphate, that of Canadian Patent No. 873,262 to form goethite or that of Canadian Patent No. 787,853 to form jarosite, may be used. We prefer to precipitate ferric iron as hematite according to the process described in The Metallurgical Society Paper A73-65, wherein iron is oxidized and precipitated under pressure to form hematite in a moderately acid solution. After removal of the iron precipitate from liquid-solid separator 46, zinc sulphate solution containing sulphuric acid (about 60 to 70 g/l $H_2SO_4$ with hematite precipitation) and about 1 to 5 g/l Fe is returned to primary leaching vessel 14 through line 16.

Preferred operation of the process, except for the preneutralization step, will now be described in more detail and will be related to compositions tabulated in Table 1.

Table 1

Typical Compositions of solids (%) and Solutions (g/l)
Zinc Plant Residue Leaching Process

| | Zn | Pb | % or g/l Fe | S | $H_2SO_4$ |
|---|---|---|---|---|---|
| Feed to First Leaching Step | | | | | |
| Zinc Plant Residue (%) | 19.7 | 5.9 | 31.4 | — | — |
| Zinc Concentrate (%) | 53 | 1.5 | 8.0 | 33.0 | — |
| Return Acid (g/l) | 50 | — | — | — | 150 |
| Products | | | | | |
| First Leach Thickener Overflow (g/l) | 85.1 | nil | 36.7 | — | 15 |
| Lead silver residue (%) | 4.7 | 30.1 | 2.7 | 25.3 | — |
| Flotation solids (%) | 30.7 | 0.8 | 8.1 | 59.9 | — |
| Neutralization residue, single stage (%) | 1.9 | nil | 2.8 | — | — |
| Hematite precipitate (%) | 0.6 | nil | 59.0 | — | — |
| Solution from hematite pptn. (g/l) | 81.8 | nil | 3.35 | — | 59.3 |

2 to 3 g/l $H_2SO_4$ in the slurry entering thickener 25 avoids precipitation from the solution, at this stage, of dissolved impurities to be removed by the limerock treatment. Recycle of these impurities by precipitation and separation with the thickener underflow and then dissolving in acid added to the second residue leaching step is avoided.

Overflow solution from thickener 25 flows through line 40 to be partially or wholly neutralized in vessel 41. Here, a neutralizing agent such as limerock is added to bring the solution to about pH 4.5. A little iron, about 1 to 7% of the iron in solution, is allowed to oxidize and precipitate. Impurities such as germanium, indium, gallium, antimony and arsenic are coprecipitated with this iron and gypsum which is formed on neutralization of the limerock. The amount of limerock required may be decreased by preneutralization with zinc oxide or calcine in vessel 48. Precipitation in two stages, as disclosed by S. Tsunoda et al in Paper A 73-65 of The Metallurgical Society of AIME, permits economic recovery of germanium, indium and gallium as well as a relatively pure gypsum product. The precipitate is removed from the solution in liquid-solid separator 42, while solution containing ferrous iron and zinc moves through line 43 to oxidation and precipitation vessel Indicated sulphur for the zinc concentrate is primarily in an active divalent form in such compounds as FeS, ZnS and PbS. Sulphur in the lead silver residue is primarily sulphate, while sulphur in the flotation solids is primarily unreacted zinc concentrate reductant and elemental sulphur.

Hot acid leaching of zinc plant residue takes place in an agitated tank at about 95°C. The quantity of zinc concentrate that is added to the leach solution normally provides about 1.2 to 1.4 times the stoichiometric sulphide sulphur that is needed to reduce the ferric iron in the residue to the ferrous state, following the reaction of the equation;

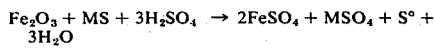

The leach liquor for this first residue leaching step is solution derived from the second leaching step, after excess zinc concentrate, elemental sulphur and residue containing lead and silver have been removed. It contains about 120 to 140 g/l $H_2SO_4$. We have observed that when insufficient sulphide sulphur is added to the first leaching step, some ferric sulphate remains in solution. During removal of iron from solution later in the process, this ferric sulphate tends to form a precipitate which is relatively difficult to separate by filtration or settling means. However, a range between 1.0 and 1.6 times the stoichiometric requirement of sulphide sulphur is generally acceptable. In this first residue leaching step, about 75 to 80% of the ferrite is dissolved in about 2 hours. We have observed that the dissolving time is shorter and the required excess of reductant is less if zinc concentrate, which is normally a flotation product about 80% minus 200 mesh (74 micron diameter), is ground to decrease the particulate size, e.g., to about 90% minus 325 mesh (44 micron diameter), before it is added to the first residue leaching step. Slurry leaving this step contains 10 to 20 g/l excess $H_2SO_4$, sufficient to keep dissolved zinc in solution. Treatment of the slurry in a thickener results in an overflow solution containing about 70 to 90 g/l zinc and about 30 to 45 g/l ferrous iron.

Solids in the thickener underflow, comprising unconsumed zinc sulphide concentrate, elemental sulphur, undigested zinc plant residue, insoluble lead residue and gangue, are treated in a second hot acid leaching step. Here, the acidity is increased by addition of return acid from electrolytic cells fortified, if necessary, with concentrated sulphuric acid. Between 80°C and the boiling point of the solution and at atmospheric pressure, use of sufficient fortified acid to provide 120 to 140 g/l free sulphuric acid completes the dissolution of at least 95% of the zinc and iron in the original residue.

Slurry from the second residue leaching step is treated by flotation to separate elemental sulphur and unconsumed added zinc sulphide concentrate from residue containing lead and silver. These metal values are more economically recovered from flotation tailings. Also, unconsumed zinc concentrate may be returned to primary treatment roasters without recycling the lead and silver values. With thickening and drying of flotation cell tailings, a lead residue containing about 30% Pb, 3% Fe and 5% Zn is obtained. The composition of this residue varies with concentrations of the metals and insoluble gangue originally in the zinc concentrate. Free acid in the solution discharged from the second residue leaching step is not affected by the flotation and thickener separations of solids. Zinc sulphate solution containing 120 to 140 g/l $H_2SO_4$ is cycled to the first leaching step for reaction with zinc plant residue.

Overflow solution from the thickener after the first residue leaching step also contains impurities in the form of germanium, antimony, etc. Build-up of these impurities in recycling solution will occur unless they are removed. This removal is accomplished by neutralizing all or part of the solution with limerock to about pH 4.5, permitting a small part of the ferrous iron, about 1 to 7 per cent, to oxidize and coprecipitating these impurities with the ferric iron so formed. If the impurity levels are high, oxidation and precipitation of more iron will promote greater elimination. With subsequent preferred precipitation of iron as hematite, which is carried out in strongly acid solution, it may be advantageous to neutralize as little as one third of the overflow solution from the thickener of the first residue leaching step. Solution not being neutralized then passes through the neutralizer bypass to combine with neutralized solution before entering the iron precipitation step. In continuous operation, solution entering the oxidation and precipitation step will be neutral or slightly acid (about 10 g/l free $H_2SO_4$). Free acid formed in producing hematite by the oxidation and precipitation reaction of equation $$2FeSO_4 + 1/2O_2 + 2H_2O \rightarrow Fe_2O_3 + 2H_2SO_4$$

raises the acidity in the autoclave to about 60 to 70 g/l $H_2SO_4$, thereby ensuring conditions for the precipitation of crystalline, filterable hematite.

The process of the present invention has advantages over prior art processes. Digestion of zinc plant residue in two reduction leach steps is more rapid than digestion in oxidation or non-reducing leaching processes, and more complete than processes which use one reduction leach step in combination with leaching under oxidizing or non-reducing conditions. Use of the process of the present invention also permits separation of a substantial volume of solution after the first leach step and treatment of remaining difficult-to-digest refractory compounds with more concentrated acid in the second step. Since iron is not separated during nor after the second leach step, none of the sulphuric acid present in this leach and subsequent separation steps needs to be neutralized. This acid is returned, after separation of solids, to the first residue leaching step. In this way, relatively concentrated sulphuric acid from the second residue leaching step is not carried to the limerock neutralization step, but is usefully consumed in the first residue leaching step. Benefits of strong acid second stage leaching are obtained without corresponding increase in limerock consumption during neutralization. Unconsumed added zinc sulphide concentrate and elemental sulphur are returned to the primary concentrate roasting process without recycling lead and silver values. With preferred precipitation of iron as hematite, it is not necessary to neutralize purified solution to the difficult-to-control pH ranges which are necessary to provide easy filtering or rapid settling of such precipitates as goethite, jarosite and basic iron sulphate. Sulphuric acid formed during oxidation of ferrous iron is used to leach roasted zinc concentrate.

Although zinc oxide containing material might be used in the neutralization step for the removal of germanium, antimony, etc., inexpensive limerock is preferred because the products of its reaction do not contain valuable metals which may not be economically recoverable from the waste products. Introduction of zinc oxide calcine neutralizing agent into the process at this stage also introduces untreated zinc ferrite contained in the calcine, with consequent loss of zinc values to separated solids.

What we claim as our invention is:

1. A process for the treatment of zinc plant residue formed on leaching zinc calcine with sulphuric acid which comprises: leaching the residue in a first leaching step with a sulphuric acid solution at atmospheric pressure, and a temperature above about 60°C, in the presence of excess zinc sulphide reductant whereby ferric iron in the residue is reduced to the ferrous state, thereby forming a slurry of zinc sulphate solution containing excess sulphuric acid and having ferrous iron and other impurities of the group consisting of germanium, indium, gallium, antimony, and arsenic dissolved therein, and a mixture of solids containing undissolved zinc residue, insoluble lead-containing residue, unreacted zinc sulphide and elemental sulfur; separating solution from the mixture of solids; leaching the mixture of solids in a second residue leaching step at atmospheric pressure and at a temperature above about 60°C with a sulphuric acid solution which is substantially higher in acid than the acid solution used in the first residue leaching step, the unreacted zinc sulphide from the first residue leaching step providing reducing conditions in the second residue leaching step; treating a slurry formed in the second residue leaching step by flotation and liquid-solids separation to separate a froth product comprising unreacted zinc sulphide and elemental sulphur, a tailings product comprising gangue and a lead-containing residue, and an acidic solution; recycling the acidic solution to the first residue leaching step; treating at least a portion of the zinc sulphate solution separated after the first residue leaching step by oxidizing a small part of the ferrous iron in said portion of the solution; neutralizing this portion of the solution with limerock to precipitate solids containing oxidized iron, gypsum, and said other impurities, separating the precipitated solids from this portion of the solution; combining this portion with the remaining portion of zinc sulphate solution not so treated; oxidizing ferrous iron in the combined solution to precipitate ferric iron compounds; separating the ferric iron compounds from the resulting zinc sulphate solution; and recovering the zinc sulphate solution.

2. A process as claimed in claim 1 wherein the zinc sulphate solution obtained after separation of ferric iron compounds is returned to the zinc calcine leaching step for reaction of sulphuric acid contained therein with zinc calcine and recovery of neutral zinc sulphate solution.

3. A process as claimed in claim 1 wherein the acidic solution from the second residue leaching step provides the sulphuric acid used in the first residue leaching step.

4. A process as claimed in claim 1 wherein the unreacted zinc sulphide and elemental sulphur separated in the flotation step are dried and fed to a roaster in which zinc concentrate is calcined.

5. A process as claimed in claim 1 wherein the sulphuric acid used in the second residue leaching step is fortified with concentrated sulphuric acid.

6. A process as claimed in claim 1 wherein at least about one third of the zinc sulphate solution separated from the mixture of solids after the first residue leaching step is neutralized to precipitate impurities, and the portion of the solution not being so treated passes through a neutralizer by-pass to combine with purified solution, before entering the step in which ferrous iron is oxidized and precipitated as ferric iron.

7. A process as claimed in claim 6 wherein all said zinc sulphate solution is neutralized with limerock to precipitate said impurities.

8. A process as claimed in claim 1 wherein the slurry from the first residue leaching step is treated, before separating the mixture of solids, with zinc oxide or zinc calcine to neutralize, without precipitating said other impurities, part of said excess sulphuric acid.

9. A process as claimed in claim 1 wherein ferrous iron in solution after separation of solids precipitated in the limerock neutralization step, is oxidized in an autoclave to precipitate hematite, in a reaction which raises the acidity of the solution containing zinc sulphate to about 60 to 70 g/l $H_2SO_4$, and the hematite is recovered.

10. A process as claimed in claim 1 wherein the zinc sulphide reductant is particulate zinc concentrate which is ground before being added to the first residue leaching step.

11. A process for the treatment of zinc plant residue formed on leaching zinc calcine with sulphuric acid which comprises: leaching the residue in a first residue leaching step with a sulphuric acid solution containing 120 to 140 g/l $H_2SO_4$ at atmospheric pressure and a temperature between 60°C and the boiling point of the solution, in the presence of excess zinc sulphide reductant, whereby ferric iron in the residue is reduced to the ferrous state, thereby forming a slurry of zinc sulphate solution containing about 10 to 20 g/l $H_2SO_4$, about 35 to 45 g/l ferrous iron and other impurities of the group consisting of germanium, indium, gallium, antimony, and arsenic dissolved therein and a mixture of solids containing residue, unreacted zinc sulphide reductant and elemental sulphur; thickening the slurry to separate an overflow of clarified zinc sulphate solution containing said sulphuric acid, ferrous iron and dissolved impurities, from an overflow containing the mixture of solids, leaching the underflow thus obtained in a second residue leaching step with a solution which is substantially higher in acid than the acid solution used in the first residue leaching step at atmospheric pressure and at temperature between 60°C and the boiling point of the solution, the unreacted zinc sulphide reductant from the first residue leaching step providing reducing conditions in said second residue leaching step; treating slurry formed in the second residue leaching step by flotation and liquid-solids separation to separate a froth product comprising unreacted zinc sulphide and elemental sulphur, a tailings product comprising gangue and a lead-containing residue, and an acidic solution; recycling this acidic solution containing zinc sulphate, ferrous iron and 120 to 140 g/l $H_2SO_4$ to the first residue leaching step; treating at least a portion of the overflow of clarified zinc sulphate solution from the first residue leaching step by oxidizing from about 1 to 7% of the ferrous iron in this portion of the solution; neutralizing this portion of the solution with limerock to about pH 4.5 to precipitate solids containing oxidized iron, gypsum, and said other impurities; separating the precipitated solids from this portion of the zinc sulphate solution; combining this portion with the remainder of the overflow of clarified zinc sulphate solution not so treated; oxidizing ferrous iron in the combined solution to precipitate ferric iron compounds; separating the ferric iron compounds from the resulting zinc sulphate solution; and recovering the zinc sulphate solution.

12. A process as claimed in claim 11 wherein at least about one third of the overflow of clarified zinc sulphate solution from the first residue leaching step is neutralized to precipitate impurities, and the portion of the solution not being so treated passes through a neutralizer by-pass, to combine with purified solution, before entering the step in which ferrous iron is oxidized and precipitated as ferric iron.

13. A process as claimed in claim 12 wherein all said zinc sulphate solution is neutralized with limerock to precipitate said impurities.

14. A process as claimed in claim 11 wherein the slurry from the first residue leaching step is treated, before separating the mixture of solids, with zinc oxide or zinc calcine to decrease the acid in the slurry to about 2 to 3 g/l $H_2SO_4$, and a clarified zinc sulphate solution containing 2 to 3 g/l $H_2SO_4$, about 35 to 45 g/l ferrous iron and said other impurities is purified.

15. A process as claimed in claim 11 wherein the zinc sulphate solution obtained after separation of ferric iron compounds is returned to the zinc calcine leaching step for reaction of sulphuric acid contained therein with zinc calcine and recovery of neutral zinc sulphate solution.

16. A process as claimed in claim 11 wherein the acidic solution from the second residue leaching step provides the sulphuric acid used in the first residue leaching step.

17. A process as claimed in claim 11 wherein the unreacted zinc sulphide and elemental sulphur separated in the flotation step are dried and fed to a roaster in which zinc concentrate is calcined.

18. A process as claimed in claim 11 wherein the sulphuric acid used in the second residue leaching step is fortified with concentrated sulphuric acid.

19. A process as claimed in claim 11 wherein ferrous iron in solution after separation of solids precipitated in the limerock neutralization step, is oxidized in an autoclave to precipitate hematite, in a reaction which raises the acidity of the solution containing zinc sulphate to about 60 to 70 g/l $H_2SO_4$, and the hematite is recovered.

20. A process as claimed in claim 11 wherein the zinc sulphide reductant is particulate zinc concentrate which is ground before being added to the first residue leaching step.

* * * * *